United States Patent [19]

Martinson et al.

[11] Patent Number: 5,330,708
[45] Date of Patent: Jul. 19, 1994

[54] SULFIDE ALLOYS THAT EXHIBIT THERMAL BISTABILITY

[75] Inventors: Lee S. Martinson, Coralville; John W. Schweitzer, Iowa City; Norman C. Baenziger, North Liberty, all of Iowa

[73] Assignee: The University of Iowa Research Foundation, Iowa City, Iowa

[21] Appl. No.: 51,947

[22] Filed: Apr. 26, 1993

[51] Int. Cl.$^5$ ............................ C01F 17/00; B22F 9/00
[52] U.S. Cl. .................................... 420/415; 420/564; 420/579; 423/511
[58] Field of Search ............... 420/415, 564, 579; 423/511

[56] References Cited

U.S. PATENT DOCUMENTS

| | | | |
|---|---|---|---|
| 2,770,528 | 11/1956 | Maynard | 23/134 |
| 3,801,702 | 4/1974 | Donohue | 423/511 |
| 3,940,472 | 2/1976 | Donohue | 423/511 |
| 4,237,201 | 12/1980 | Rouxel et al. | 423/511 |
| 4,461,750 | 7/1984 | Chess et al. | 423/511 |
| 4,728,682 | 3/1988 | Covino et al. | 423/511 |
| 4,946,501 | 8/1990 | Nate et al. | 420/416 |

FOREIGN PATENT DOCUMENTS

| | | |
|---|---|---|
| 1026171 | 6/1983 | U.S.S.R. |
| 1182280 | 9/1985 | U.S.S.R. |

Primary Examiner—Upendra Roy
Attorney, Agent, or Firm—Mark L. Fleshner

[57] ABSTRACT

A new ternary sulfide alloy exhibits a metal-semiconductor phase transition with hysteresis as a function of temperature. One embodiment of the bistable material includes barium, cobalt, nickel and sulfur in amounts in accordance with the formula $Ba(Co_{1-x}Ni_x)S_{2-y}$, and x is between 0 and 1 and y varies from 0 to 2.

8 Claims, 16 Drawing Sheets

Ba

S1
Ni
S2

SULFIDE ALLOYS THAT EXHIBIT THERMAL BISTABILITY

BACKGROUND OF THE INVENTION

Field of the Invention

This invention relates generally to a material which exhibits thermal bistability and in particular, to a ternary sulfide alloy which exhibits a metal-semiconductor phase transition with hysteresis as a function of temperature.

Background of the Related Art

A thermally bistable material exhibits hysteresis if its physical properties (e.g., resistivity, optical reflectivity and thermal conductivity) differ over a given temperature range when it is heated versus when it is cooled. Such bistable materials can be used to make a binary switch, whereby the switch is in a first state, (the "0" state) when the bistable material is in a first (physical) state, and the switch is in a second state (the "1" state) when the bistable material is in a second (physical) state. Additional applications of thermally bistable materials are discussed in "Metal-Semiconductor Phase Transitions in Vanadium Oxides and Technical Applications," by F. Chudnovskii, Soy. Phys. Tech. Phys. Vol. 20, p. 999 (1976) and "Optical Properties of Vanadium Dioxide and Vanadium Pentoxide Thin Films," E. Chain, Appl. Optics, Vol. 30, p. 2782 (1991).

Bistable materials typically change from a semiconducting state to a metallic state with an increase in temperature, i.e., from (1) a state in which the resistivity is large and decreases as the temperature increases (a semiconducting state) to, (2) a state in which the resistivity is small and increases as the temperature increases (a metallic state). Bistable materials which undergo a phase transition from a semiconducting state to a metallic state with an increase in temperature are said to have a negative temperature coefficient (NTC).

An example of a thermally bistable NTC material with hysteresis is vanadium dioxide ($VO_2$). In addition to being used in binary switches, vanadium dioxide has been used to make heat pipes and sensor elements. Nevertheless, it is sometimes advantageous that the thermally bistable material have a positive temperature coefficient (PTC), i.e., the material changes from a metallic phase to a semiconducting phase with increasing temperature as discussed, for example, in "Understanding doped $V_2O_3$ as a Functional Positive Temperature Coefficient Material," by B. Hendrix et. al, J. Mater. Sci. Mater. Elect., Vol. 3, p. 113 (1992). These advantages can include low resistivity, high thermal conductivity and desirable optical properties on the low temperature side of the transition.

It is also desirable to be able to control the temperature at which the bistability occurs. For example, if the bistable material is being used to make temperature sensing switches, it may be necessary that some of these switches undergo a phase transition at a first temperature while others of these switches undergo the phase transition at a second temperature. A useful bistable material should exhibit different transition temperatures with small changes in the chemical composition or with the application of easily accessible pressures.

Quite apart from the study of bistable materials is the study of new barium ternary alloys. For example, U.S. Pat. No. 2,770,528 discusses barium ferrous group metal ternary sulfides such as barium cobalt sulfide ($BaCoS_2$) or barium nickel sulfide ($BaNiS_2$). However, neither of these compounds are thermally bistable materials and consequently, neither $BaCoS_2$ nor $BaNiS_2$ exhibits a metallic-semiconducting phase transition such as observed in vanadium dioxide.

SUMMARY OF THE INVENTION

It is therefore an object of the invention to provide a bistable material which changes physical properties with a change in temperature while exhibiting hysteresis.

Another object of the invention is to provide a thermally bistable material with a positive temperature coefficient.

Another object of the invention is to provide a thermally bistable material which changes from a metal to a semiconductor with an increase in temperature.

Another object of the invention is to provide a thermally bistable material which changes from a material in a first magnetic state to a material in a second magnetic state with a change in temperature.

One advantage of the invention is that the temperature at which the phase transition occurs can be varied in accordance with the relative molar amounts of elements in the material.

Another advantage of the invention is that it provides a thermally bistable material in addition to vanadium compounds.

Another advantage of the invention is that it is chemically stable when exposed to air or moisture.

Another advantage of the invention is that it is structurally stable when cycled through the phase transition.

One feature of the invention is that it has a positive temperature coefficient.

Another feature of the invention is that it changes from a metallic state to a semiconducting state with an increase in temperature.

Another feature of the invention is that it is a bistable material which changes magnetic states with a change in temperature.

The above and other objects, advantages and features are accomplished by the provision of a bistable material $A(Co_{1-x}M_x)X_{2-y}$, where x is greater than 0 and less than 1, y is equal to or greater than 0 and less than 2, and A is one of a group 1, group 2, and/or rare earth element, M is a transition metal, and X is one of S, Se, and Te.

The above and other objects, advantages and features are further accomplished when A is barium, M is nickel and X is sulfur.

The above and other objects, advantages and features are further accomplished by the provision of a thermally bistable material $Ba(Co_{1-x}Ni_x)S_{2-y}$ having a positive temperature coefficient, where x is greater than 0 and less than 0.25 and y is greater than or equal to 0 and less than or equal to 0.2.

The above and other objects, advantages and features are accomplished by the provision of a process for making a bistable material including the steps of: providing a composition of Ba:Co:Ni:S in a molar ratio of 1:1-x:x:2-y, where x is greater than 0 and less than 1, y is greater than 0 and less than 2; heating the composition to 300 degrees Celsius in vacuum; and then heating the composition to 850 degrees Celsius in vacuum.

The above and other objects, advantages and features are accomplished by the provision of an apparatus, including: a substrate; a bistable material embedded in the substrate; a heating unit for heating the bistable material; and a coupling unit for enabling the resistance of the bistable means to be measured, wherein the bistable material includes $Ba(Co_{1-x}Ni_x)S_{2-y}$, where x is between 0 and 0.25 and y is between 0 and 0.2.

The above and other objects, advantages and features of the present invention will become more apparent from the following description of embodiments thereof taken in conjunction with the accompanying drawings.

DETAILED DESCRIPTION OF PREFERRED EMBODIMENTS

Figure 1A:
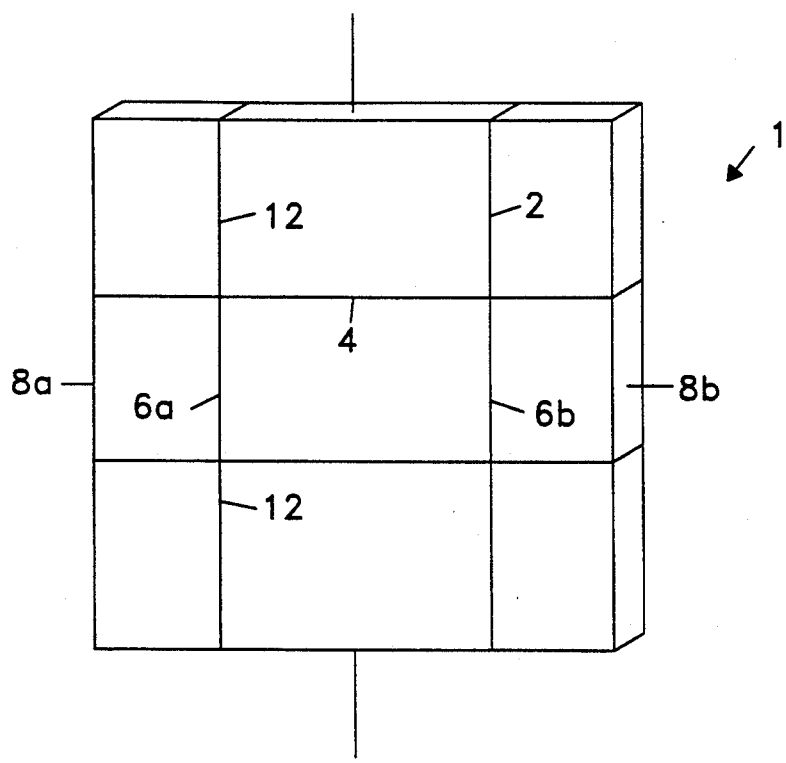
FIGS. 1A and 1B show a sensor element and a sensor array made from a bistable material exhibiting hysteresis and a graph, respectively, which can store information.
Figure 1B:
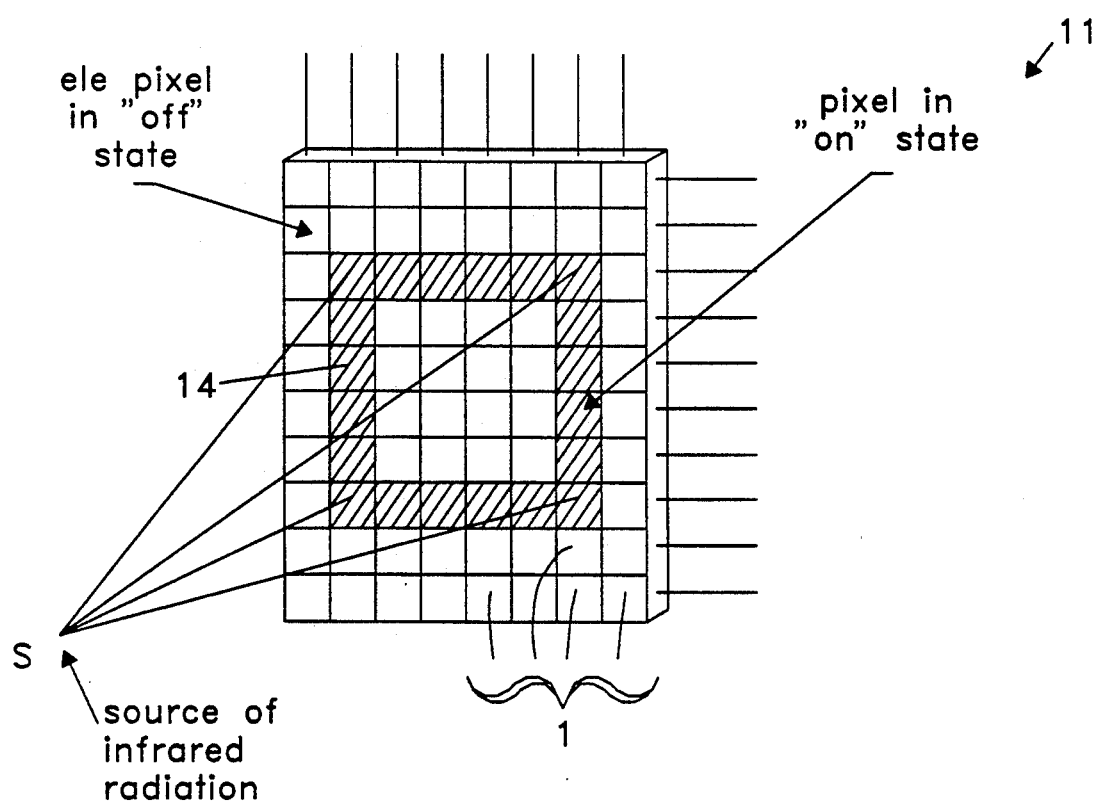
Figure 2:
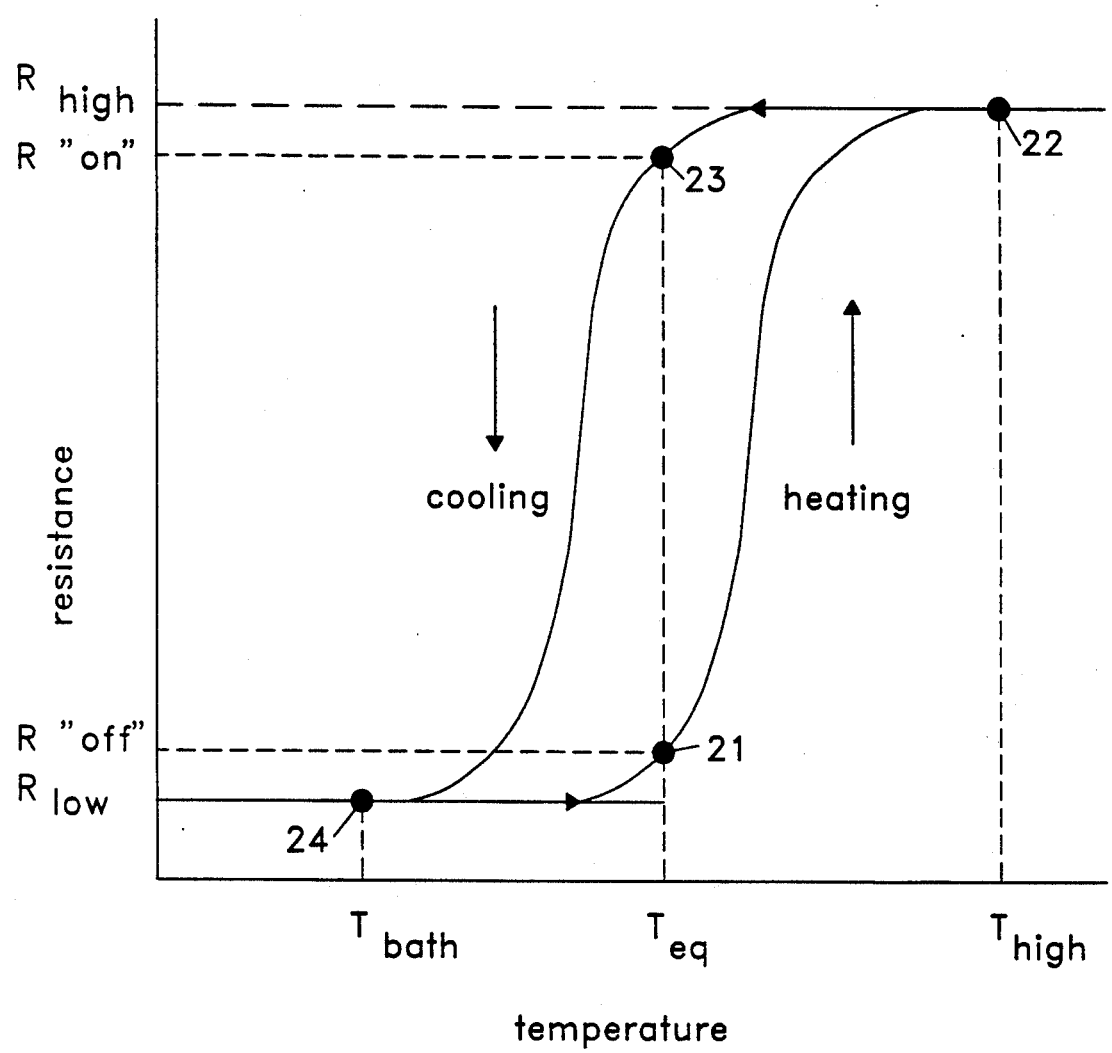
FIG. 2 shows a graph of resistance versus temperature for the sensor element of FIG. 1A.

FIGS. 1A, 1B and 2 show how information can be stored in an infrared sensor made from a bistable material which exhibits hysteresis. In particular, FIG. 1A shows a sensor element 1 which includes a substrate 2 with embedded bistable material 4 which exhibits hysteresis. Metal pads 6a and 6b are connected to leads 8a and 8b, respectively, such that the resistance of bistable material 4 can be measured. Information can be stored in sensor element 1 because the difference between a high-resistance R"on" and a low resistance R"off" of bistable material 4 is analogous to the difference between 1 and 0 in conventional information storage systems as will be explained with reference to FIG. 2.

FIG. 1B shows an array 11 composed of a plurality of sensor elements (or pixels) 1 shown in FIG. 1A. A source S of infrared radiation creates an image on array 11 which switches some elements 1 "on" while leaving other elements "off". The image remains until the information is erased.

Referring to FIG. 2, at point 21, bistable material 4 (in FIG. 1A) is held at an equilibrium temperature $T_{eq}$ above a bath temperature $T_{bath}$ (the temperature of substrate 2) by an external heater 12. At this temperature, the resistance of bistable material 4 is low (R"off"). As bistable material 4 is heated to a temperature $T_{high}$, its resistance goes from R"off" to $R_{high}$ at point 22. This heating can be accomplished using some external influence such as infrared radiation which causes local heating at bistable material 4. As the temperature of bistable material 4 decreases from $T_{high}$ back to $T_{eq}$, the resistivity of bistable material 4 remains at R"on">>R"off". This corresponds to binary state "1" as discussed above. Switching off external heater 12 allows the temperature of bistable material 4 to fall to the bath temperature $T_{high}$, thereby decreasing the resistance of bistable material 4 to the value $R_{low}$. Finally, engaging external heater 12 brings bistable material 4 back to $T_{eq}$. This corresponds to binary state "0".

Figure 3:
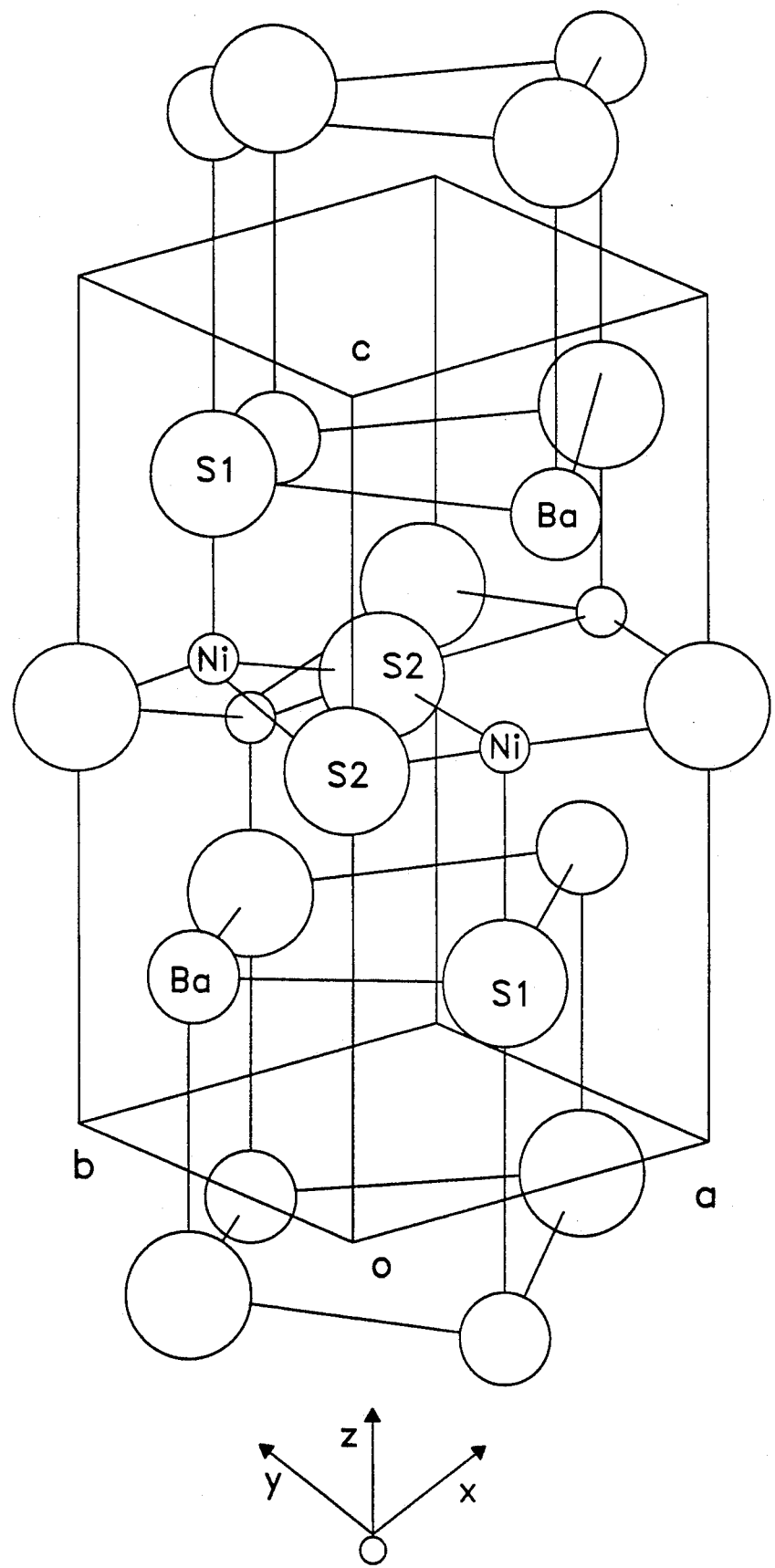
FIG. 3 shows a unit cell of $BaNiS_2$.

FIG. 3 shows a unit cell of $BaNiS_2$. The origin of the unit cell is shown at the bottom with a "0". The x-axis is the 0-a axis, the y-axis is the 0-b axis and the z-axis is the 0-c axis. As can be seen, nickel (Ni) atoms are penta-coordinated to sulfur in a nearly square-pyramidal environment. Here, the apical sulfurs are labeled S1 and the planar sulfurs are labeled S2. The apical sulfurs (S1) alternate above and below the plane formed by the bases of the pyramids (the S2 atoms). The $BaNiS_2$ structure is tetragonal and the space group is P4/nmm. The fractional atomic positions are shown in Table 1.

TABLE 1

| atom | x | y | z |
|------|--------|--------|--------|
| Ba | 0.0000 | 0.5000 | 0.1956 |
| Ni | 0.0000 | 0.5000 | 0.5858 |
| S1 | 0.0000 | 0.5000 | 0.8450 |
| S2 | 0.0000 | 0.0000 | 0.5000 |

Figure 4:
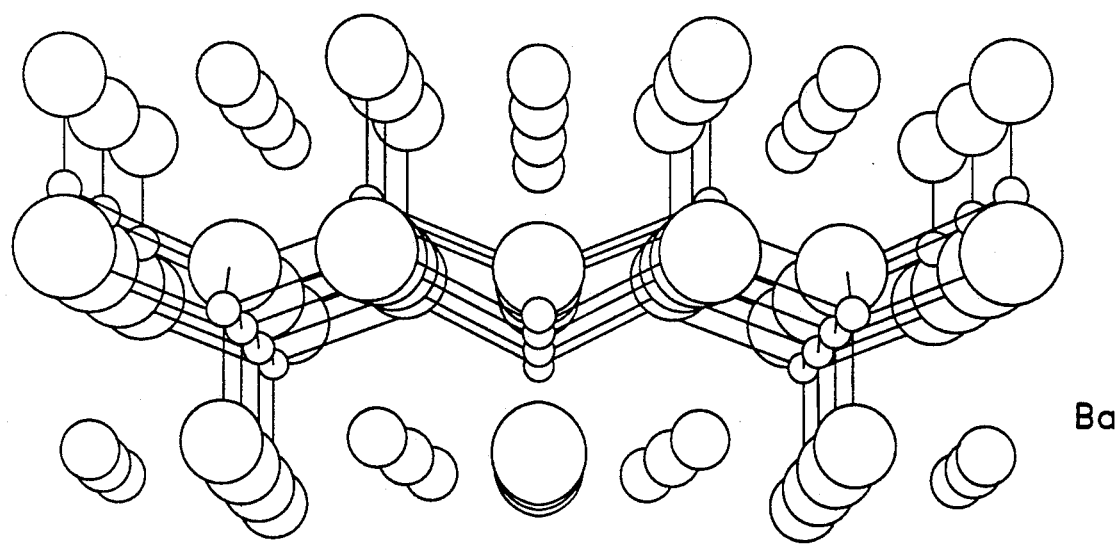
FIG. 4 is a perspective view of $BaNiS_2$ including two NIS planes when looking down the y-axis.
Figure 4:
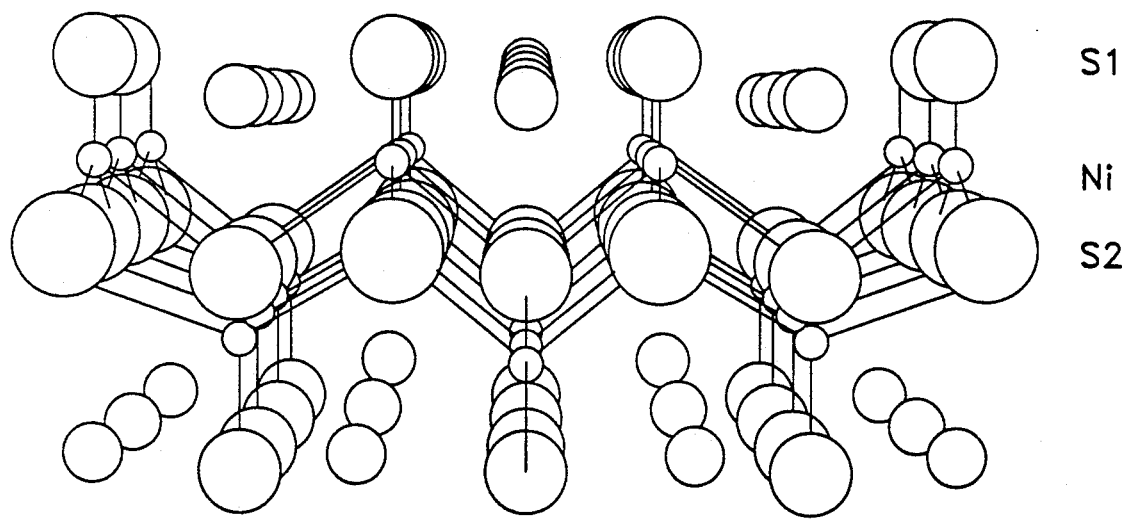
Figure 4:
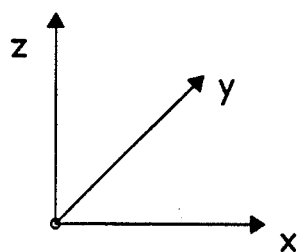

FIG. 4 is a perspective view of $BaNiS_2$ when looking down the y-axis. The distance between the inter-planar Ni atoms is more than twice the distance between the intraplanar Ni atoms. Therefore, the physical properties of materials with this structure are determined by interactions within the individual planes.

Figure 5A:
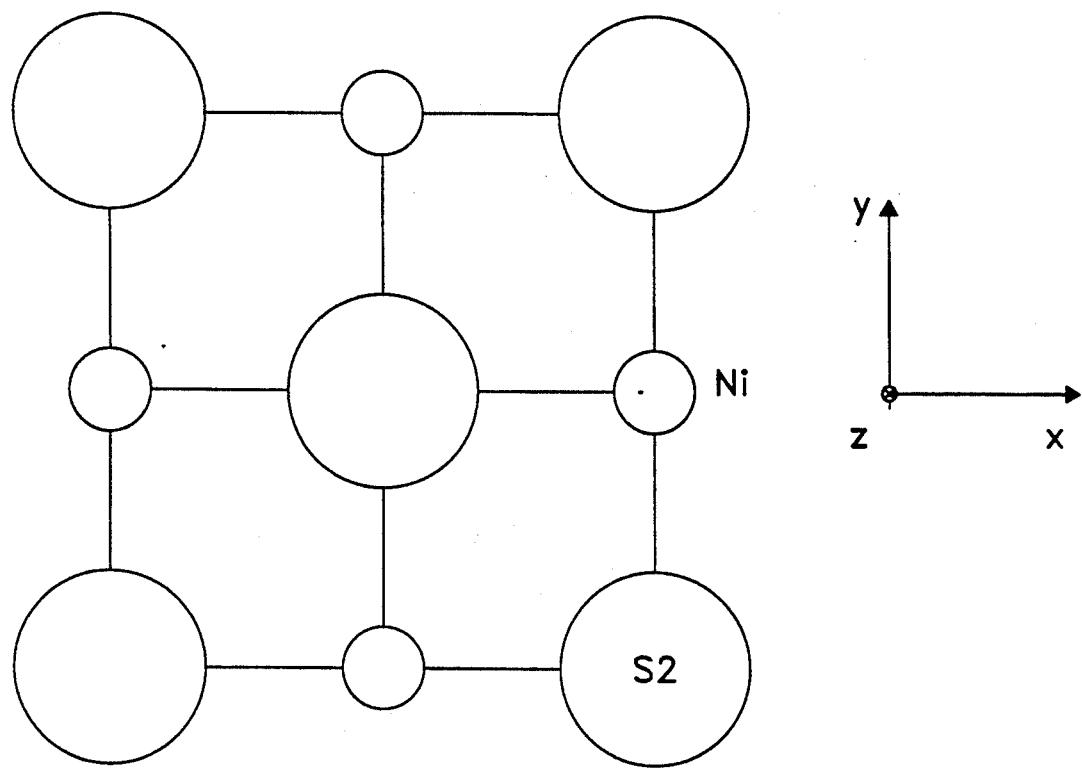
FIGS. 5A and 5B show top views of the NiS plane in $BaNiS_2$ and the CoS plane in $BaCoS_2$, respectively.
Figure 5B:
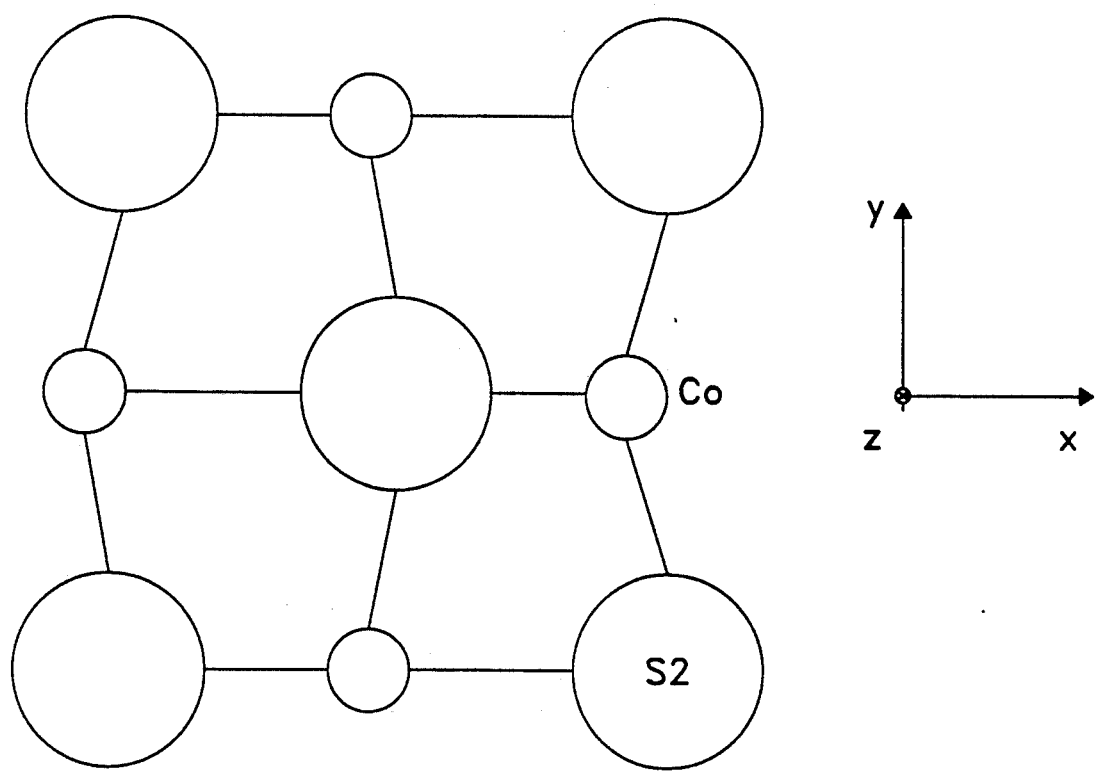

FIG. 5A shows a top view (down the z-axis) of a portion of the NiS plane depicted in FIG. 4. Here, the apical S1 sulfur atoms and the barium atoms Ba have been omitted for clarity. FIG. 5B shows the same view of a portion of the CoS plane in $BaCoS_2$. $BaCoS_2$ is a distorted version of $BaNiS_2$. In particular, although the Co atoms are penta-coordinated to sulfur as in $BaNiS_2$, the Co-S2 bonds in the plane are no longer equal. Here, the crystal system is monoclinic ($\gamma = 90.43°$), the space group is P2 and the relative atomic spacing is shown in Table 2.

TABLE 2

| atom | x | y | z |
|------|--------|--------|--------|
| Ba | 0.7500 | 0.7500 | 0.1976 |
| Co | 0.7539 | 0.7457 | 0.5937 |
| S1 | 0.7554 | 0.7453 | 0.8495 |
| S2 | 0.7434 | 0.2680 | 0.5002 |

Figure 6:
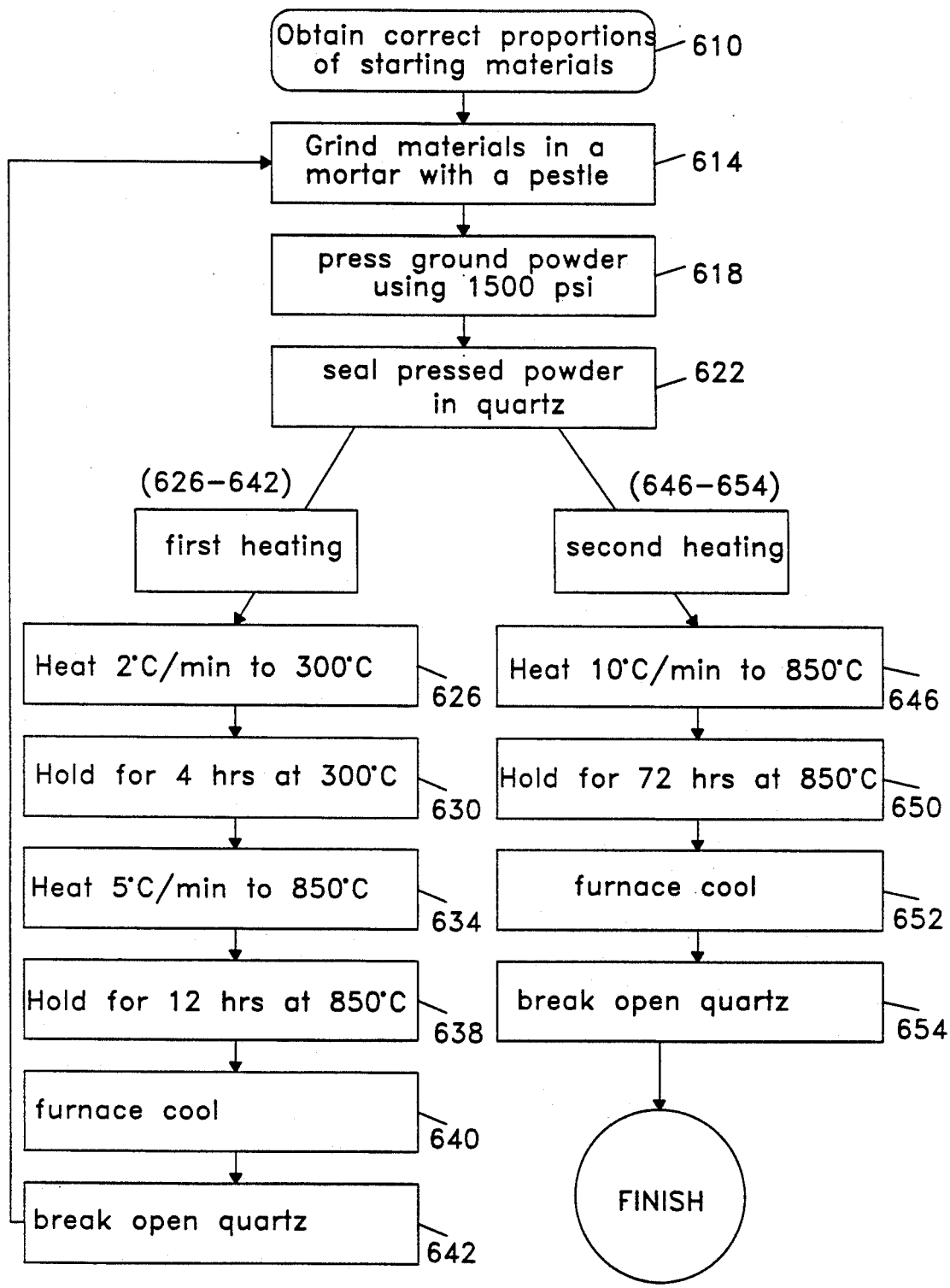
FIG. 6 shows steps involved in making $Ba(Co_{1-x}Ni_x)S_{2-y}$.

FIG. 6 shows the steps involved in producing $Ba(Co_{1-x}Ni_x)S_{2-y}$. Step 610 involves producing a starting material by obtaining the correct molar proportions of Ba, Co, Ni and S (in powder form) depending on the values of x and y. Step 614 involves pouring the measured portions of Ba, Ni, Co, and S into a mortar and grinding the starting material with a pestle into a fine powder. Step 618 involves pressing the ground powder with about 1500 psi yielding a pellet. Step 622 involves sealing pellet 800 in quartz (which will be explained in detail in the discussions of FIG. 8) in order to prevent pellet 800 from oxidizing when heated. The resulting sealed pellet is then placed in a furnace at room temperature and heated to 300° C. by increasing the temperature of the furnace two degrees Celsius per minute at step 626. When the furnace reaches 300° C., it is maintained at that temperature for 4 hours in accordance with step 630. After pellet 800 has been in the furnace for 4 hours at 300° C., the temperature of the furnace is increased 5 degrees Celsius per minute until it reaches 850° C. in accordance with step 634. When the temperature of the furnace reaches 850° C., the pellet is heated for 12 hours in accordance with step 638. The furnace is then allowed to cool down at step 640 and the quartz is broken away and removed from pellet 800 at step 642. As shown in the figure, this process (steps 646–654) is repeated with the exception that, for the second heating, the material is heated directly to 850° C. and held there for 72 hours (step 650).

Figure 7A:
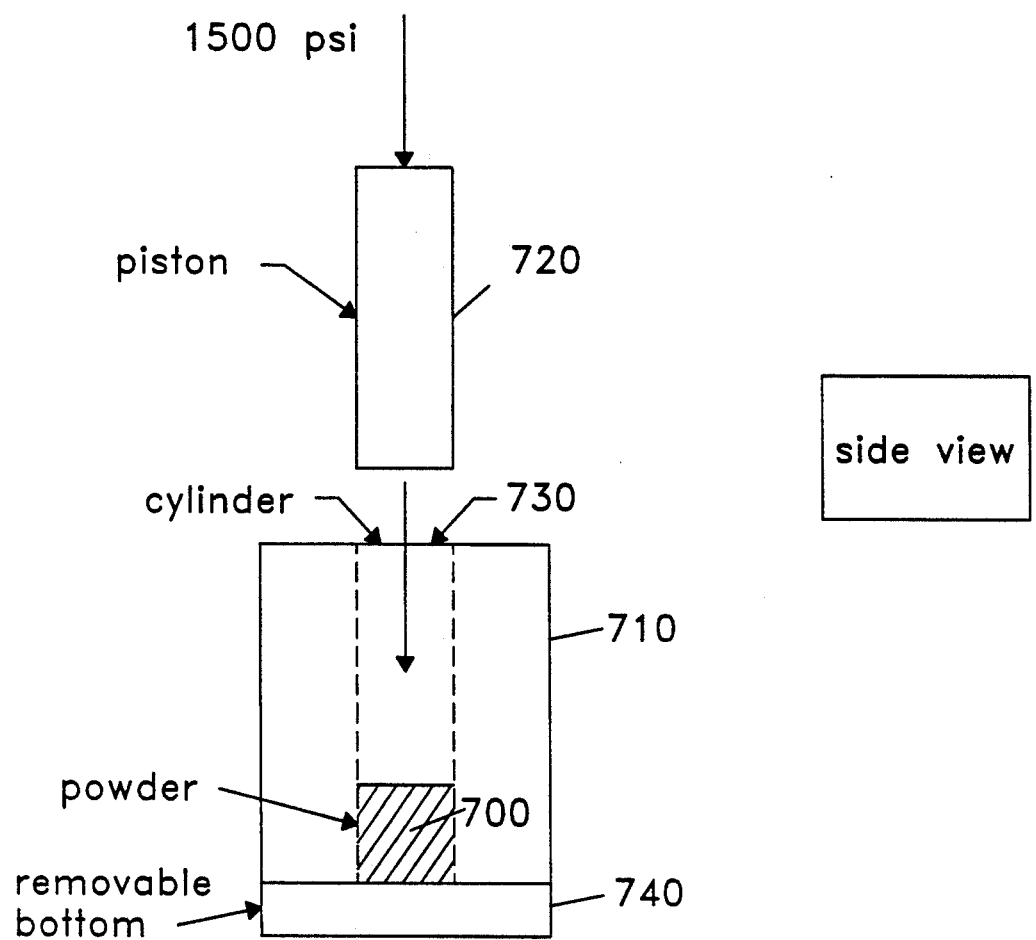
FIGS. 7A and 7B show a side and top view, respectively, of an apparatus which compresses a powdered mixture to eventually become $Ba(Co_{1-x}Ni_x)S_{2-y}$.
Figure 7B:
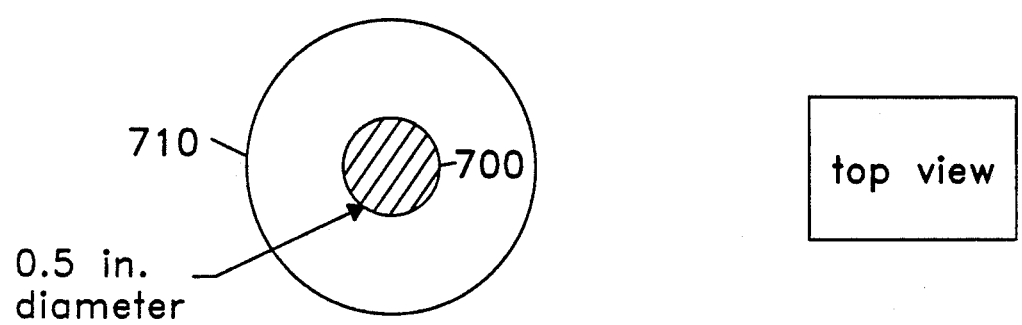

FIGS. 7A and 7B show a side and top view, respectively, of an apparatus which compresses ground powder 700 in accordance with step 618 of FIG. 6 using a stainless steel container 710 and a stainless steel plunger or piston 720. Ground powder 700 is poured into an annular opening 730 in stainless steel container 710. The diameter of the annular opening 730 is only slightly larger than the diameter of the stainless steel plunger 720. A pressure of about 1500 psi can be exerted onto plunger 720 using a mechanical hydraulic press (not shown). The removable bottom 740 allows the pellet to be extracted easily.

Figure 8:
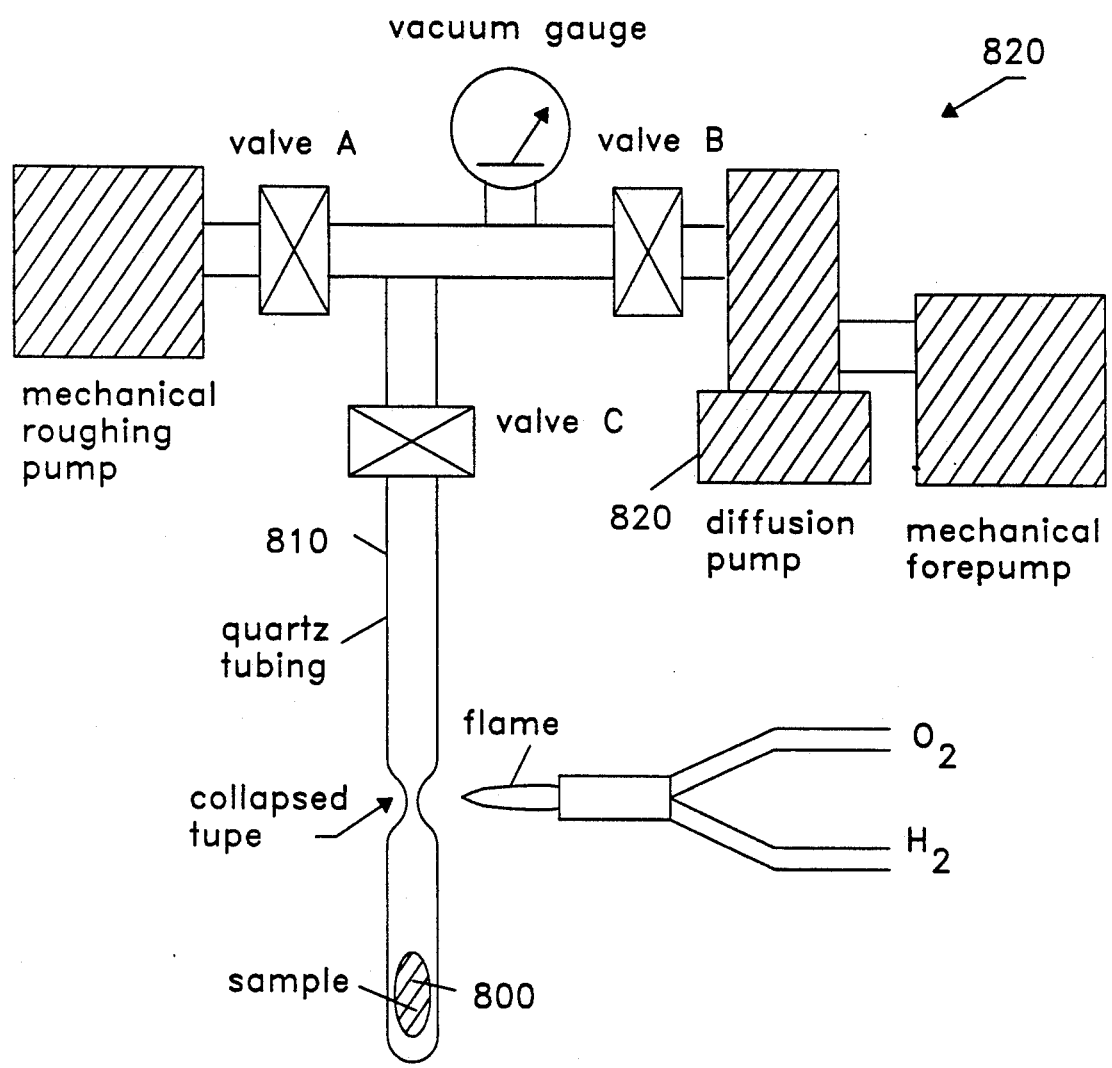
FIG. 8 shows the procedure for sealing material in quartz tubing under vacuum.

FIG. 8 shows how pellet 800 (resulting from pressing powder 700 with the mechanical hydraulic press) is sealed in quartz in accordance with step 622. In particular, FIG. 8 shows pellet 800 in a quartz tube 810 connected to a vacuum system 820. Vacuum system 820 creates a vacuum of about $10^{-5}$ Torr in quartz tube 810. Once quartz tube 810 has reached a vacuum of $10^{-5}$ Torr, it is heated with a torch directly above pellet 800. Quartz tube 810 must be heated uniformly by slowly rotating the torch around quartz tube 810. Quartz tube 810 collapses due to the vacuum and the heating, thereby sealing pellet 800 in quartz. This prevents oxidation of pellet 800 when it is heated.

EXPERIMENTAL RESULTS

Figure 9:
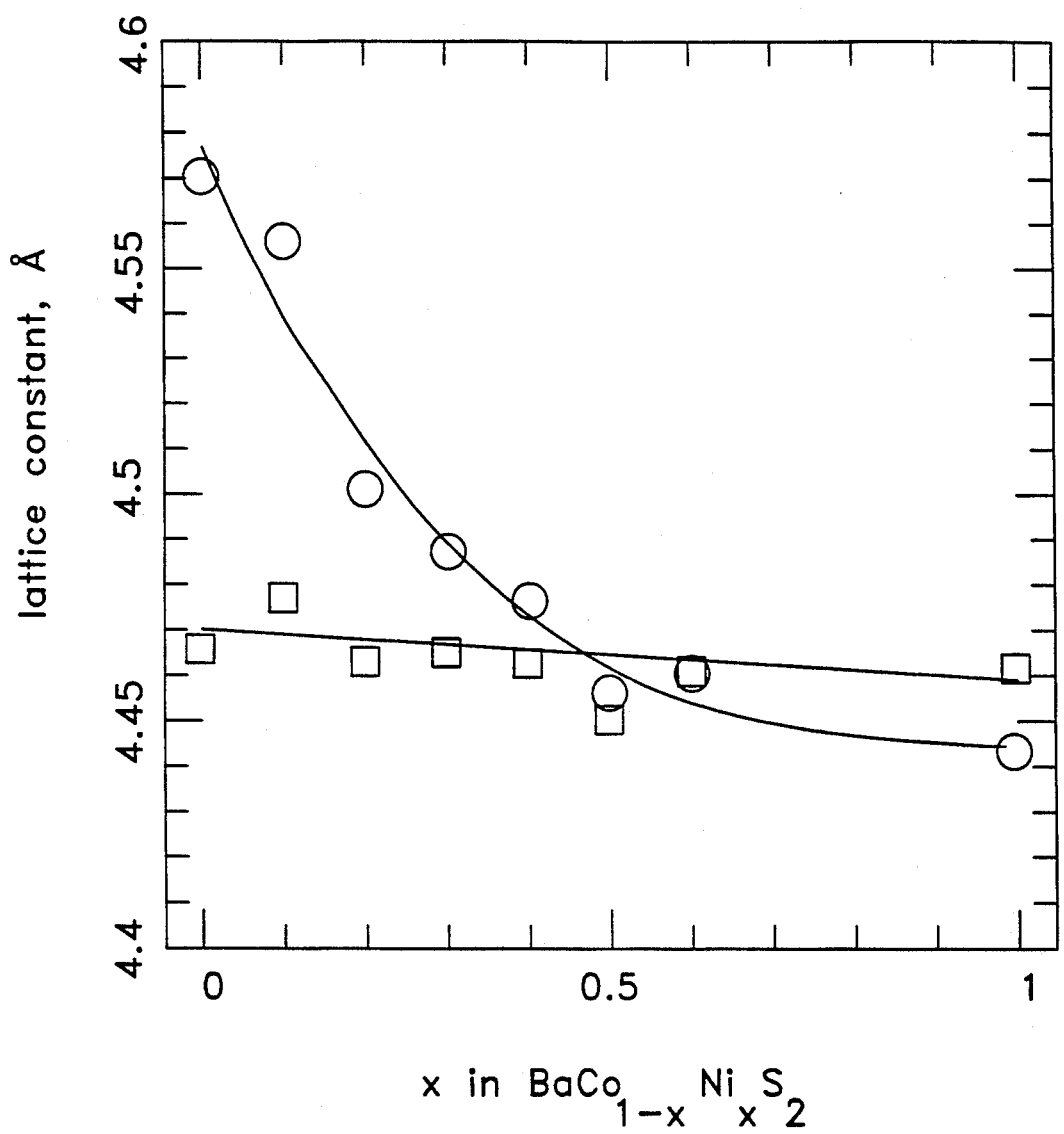
FIG. 9 shows lattice parameters for a series of samples of $Ba(Co_{1-x}Ni_x)S_2$ as x varies from 0 to 1.
Figure 10:
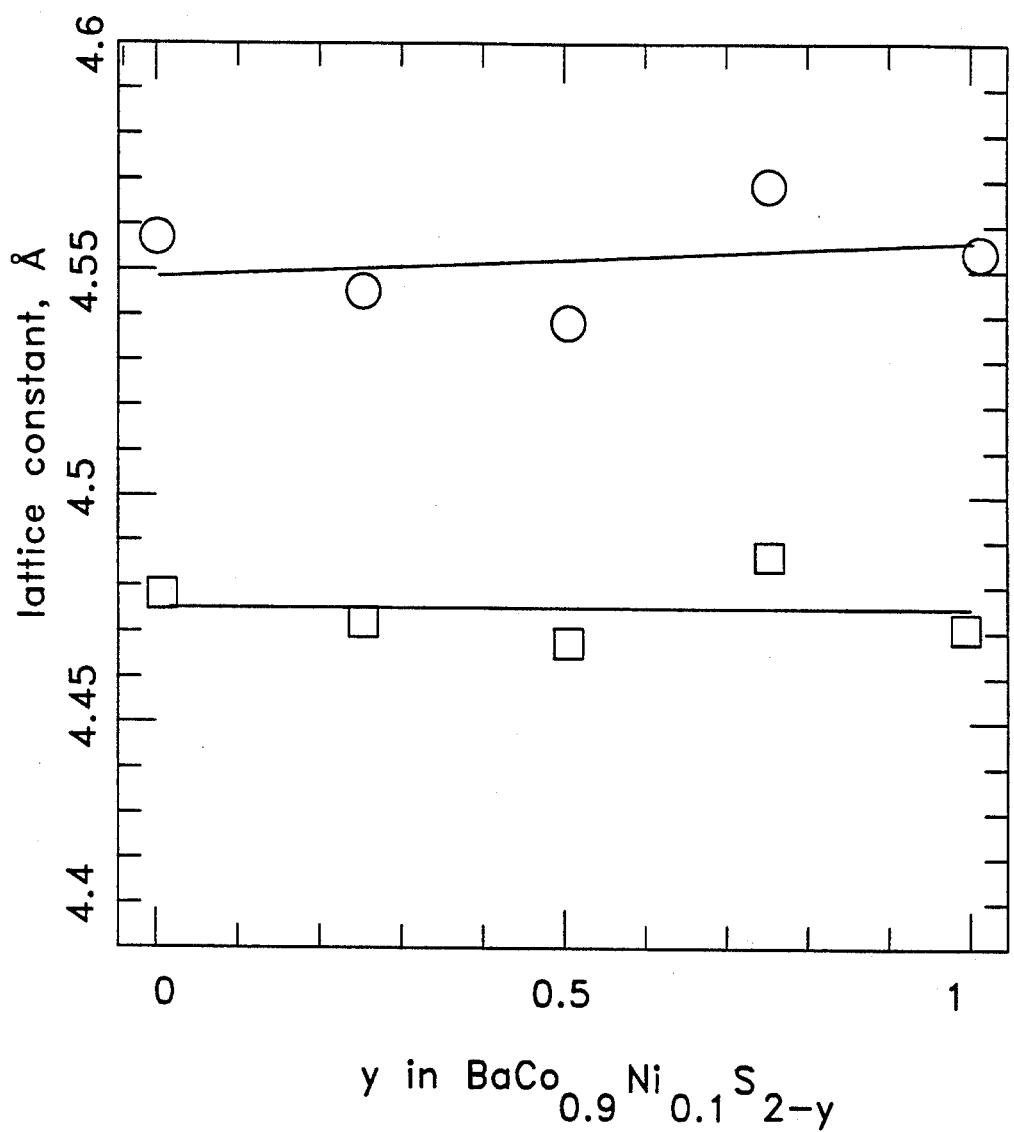
FIG. 10 shows lattice parameters for a series of samples of $BA(CO_{0.9}Ni_{0.1})S_{2-y}$ as y varies from 0 to 0.2.

FIGS. 9 and 10 show lattice parameters for a series of samples which were measured using x-ray powder diffraction with a Debye-Scherrer camera having a Straumanis film mount and Cu K-alpha radiation. In particular, FIG. 9 shows the distance 0-a on axis z (circles) of the unit cell of FIG. 3 as x varies from 0 to 1, i.e., as $Ba(Co_{1-x}Ni_x)S_2$ changes from $BaCoS_2$ to $BaNiS_2$. FIG. 9 also shows lattice parameters in the 0-c direction (squares) as $Sa(Co_{1-x}Ni_x)S_2$ varies from $BaCoS_2$ to $BaNiS_2$. This distance has been divided by 2 before being plotted for easy comparison.

FIG. 10 shows the same lattice parameters in the 0-a and 0-c directions for $BaCo_{0.9}Ni_{0.1}S_{2-y}$ as y varies from 0.0 to 0.2, i.e., as $BaCo_{0.9}Ni_{0.1}S_{2-y}$ varies from $BaCo_{0.9}Ni_{0.1}S_2$ to $BaCo_{0.9}Ni_{0.1}S_{1.8}$. As y increases, sulfur vacancies increase.

Figure 11:
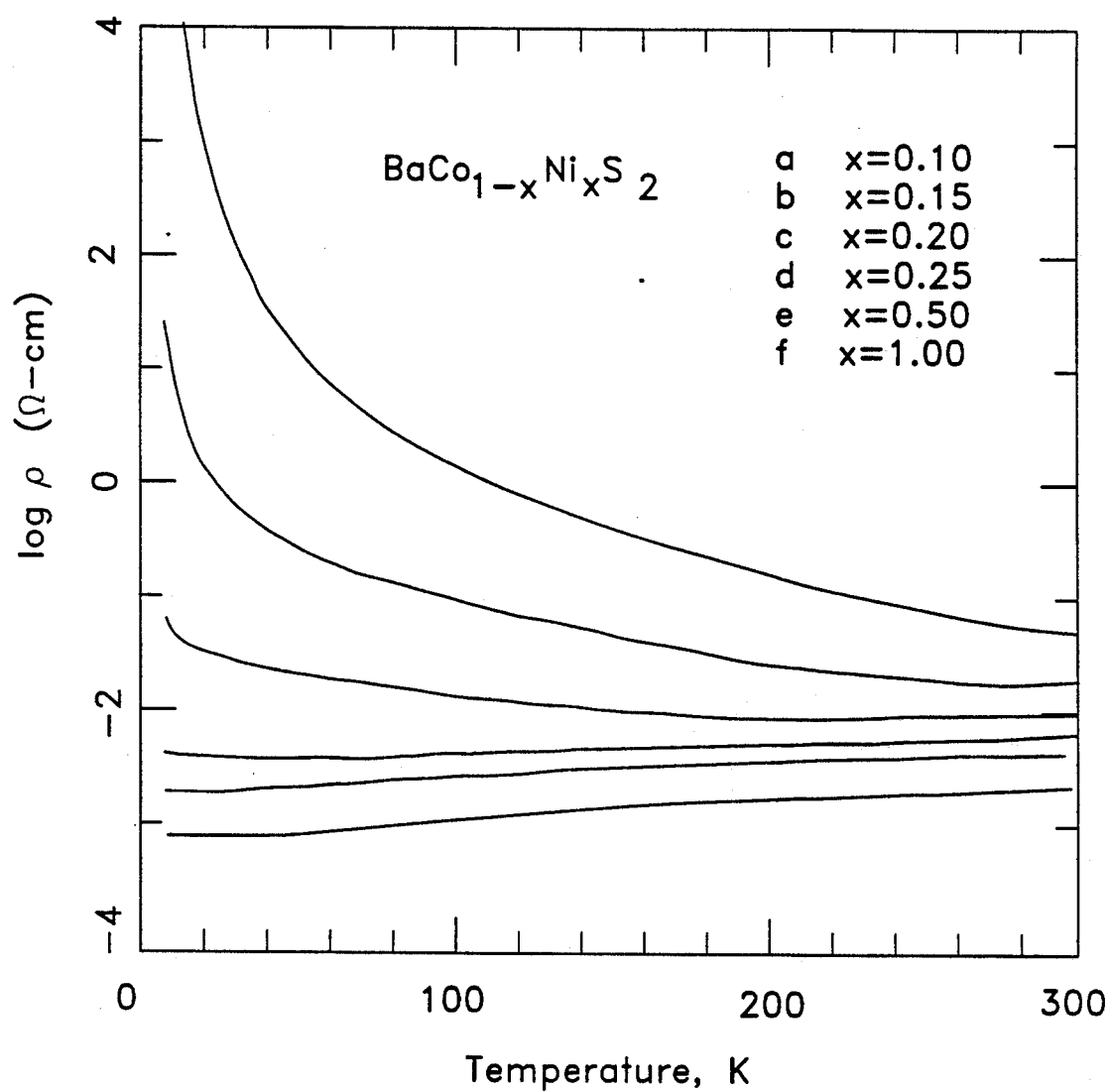
FIG. 11 shows resistance versus temperature for the series (a)-(f) of samples of $BaCo_{1-x}Ni_xS_2$, where material (a) has x=0.10, (b) has x=0.15, (c) has x=0.20, (d) has x=0.25, (e) has x=0.50 and (f) has x=1.00.

FIG. 11 shows resistance versus temperature for the series (a)-(f) of $BaCo_{1-x}Ni_xS_2$, where material (a) has x=0.10, (b) has x=0.15, (c) has x=0.20, (d) has x=0.25, (e) has x=0.50 and (f) has x=1.00. Here it was found that metallic behavior appears for x=0.25 or larger.

Figure 12:
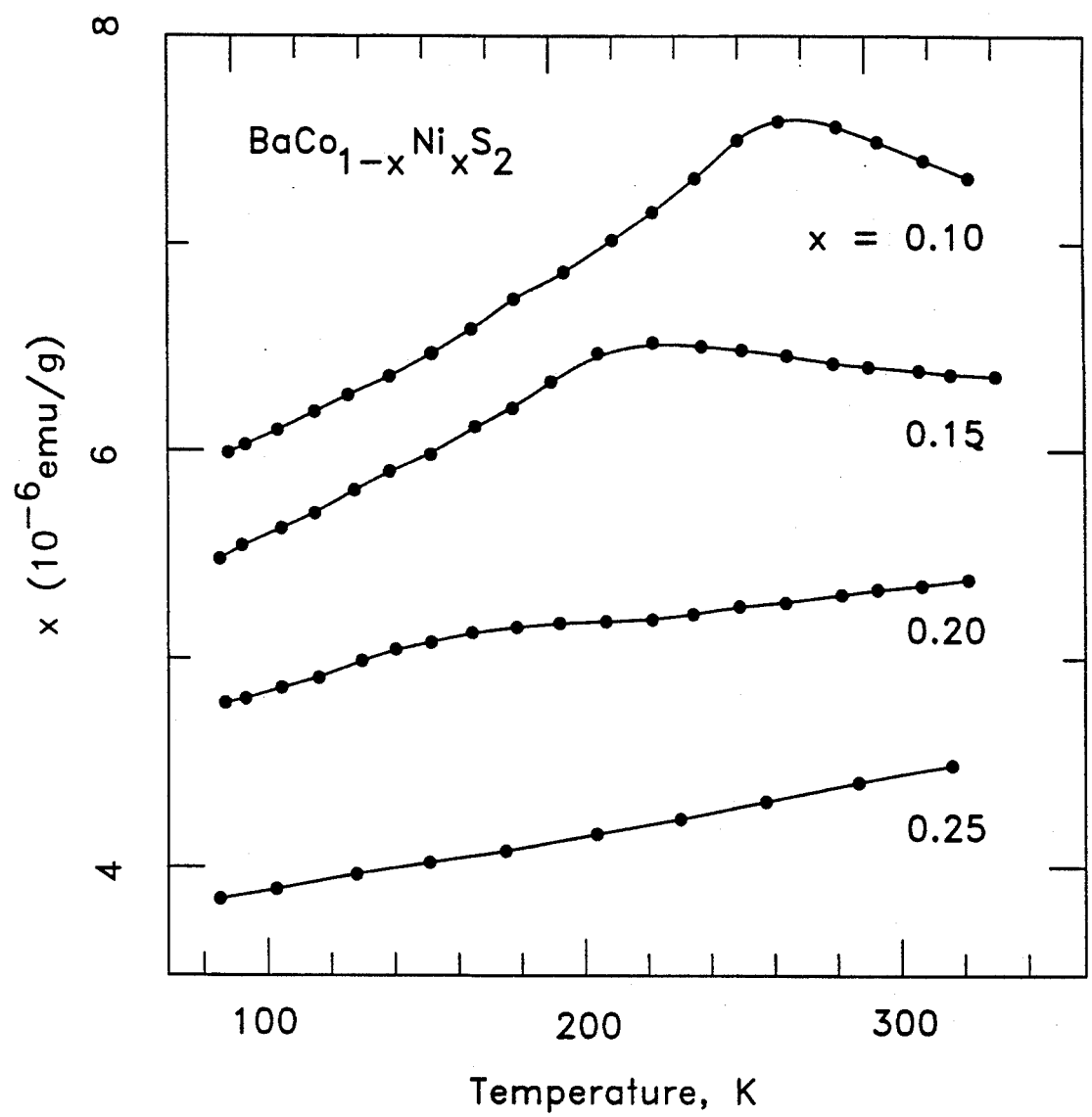
FIG. 12 shows magnetic susceptibility ($\chi$) in units of $10^{-6}$ emu/g.

FIG. 12 shows magnetic susceptibility ($\chi$) in units of $10^{-6}$ electromagnetic units/gram (emu/g) for samples (a)x=0.10, (b)x=0.15, (c)x=0.20, and (d)x=0.25 from FIG. 11. Magnetic susceptibility $\chi$ was measured using the Faraday technique with an applied magnetic field of 4 kiloGauss. It was found that the magnetic susceptibility $\chi$ has a broad maximum, which is characteristic of two dimensional antiferromagnetism. It was also found that the maximum of the magnetic susceptibility $\chi$ shifts to lower temperatures as x is increased and that the magnetic susceptibility $\chi$ is paramagnetic when the sample is in the metallic phase.

Figure 13:
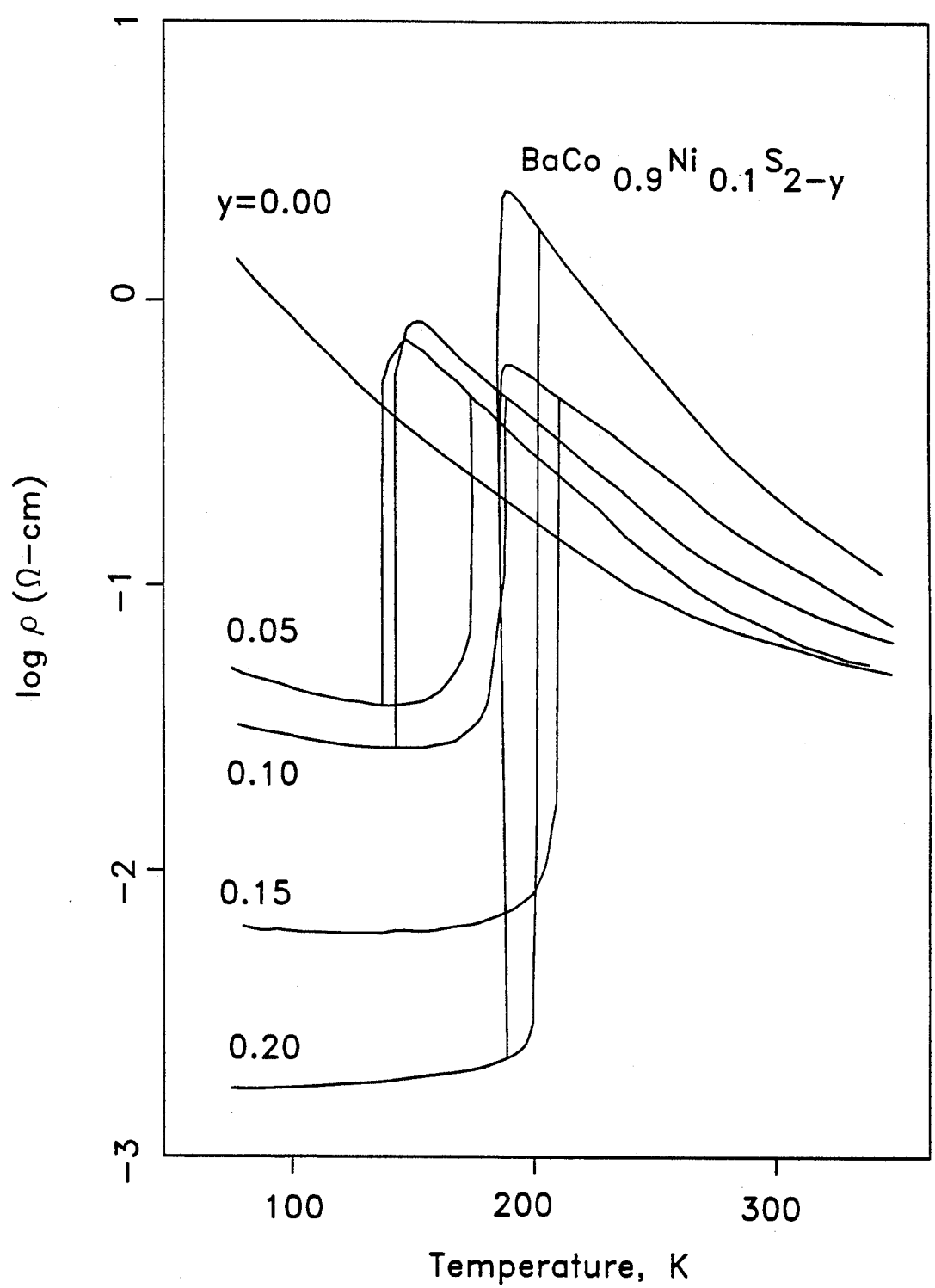
FIG. 13 shows how the resistivity changes for a series of samples of $BaCo_{0.9}Ni_{0.1}S_{2-y}$ with y=0.00, y=0.05, y=0.10, y=0.15 and y=0.20.

FIG. 13 shows how the resistivity $\rho$ changes for a series of samples of $BaCo_{0.9}Ni_{0.1}S_{2-y}$ with y=0.00, y=0.05, y=0.10, y=0.15 and y=0.20. As can be seen, a first-order phase transition appears with the addition of sulfur vacancies, i.e., when y is greater than 0.

Figure 14:
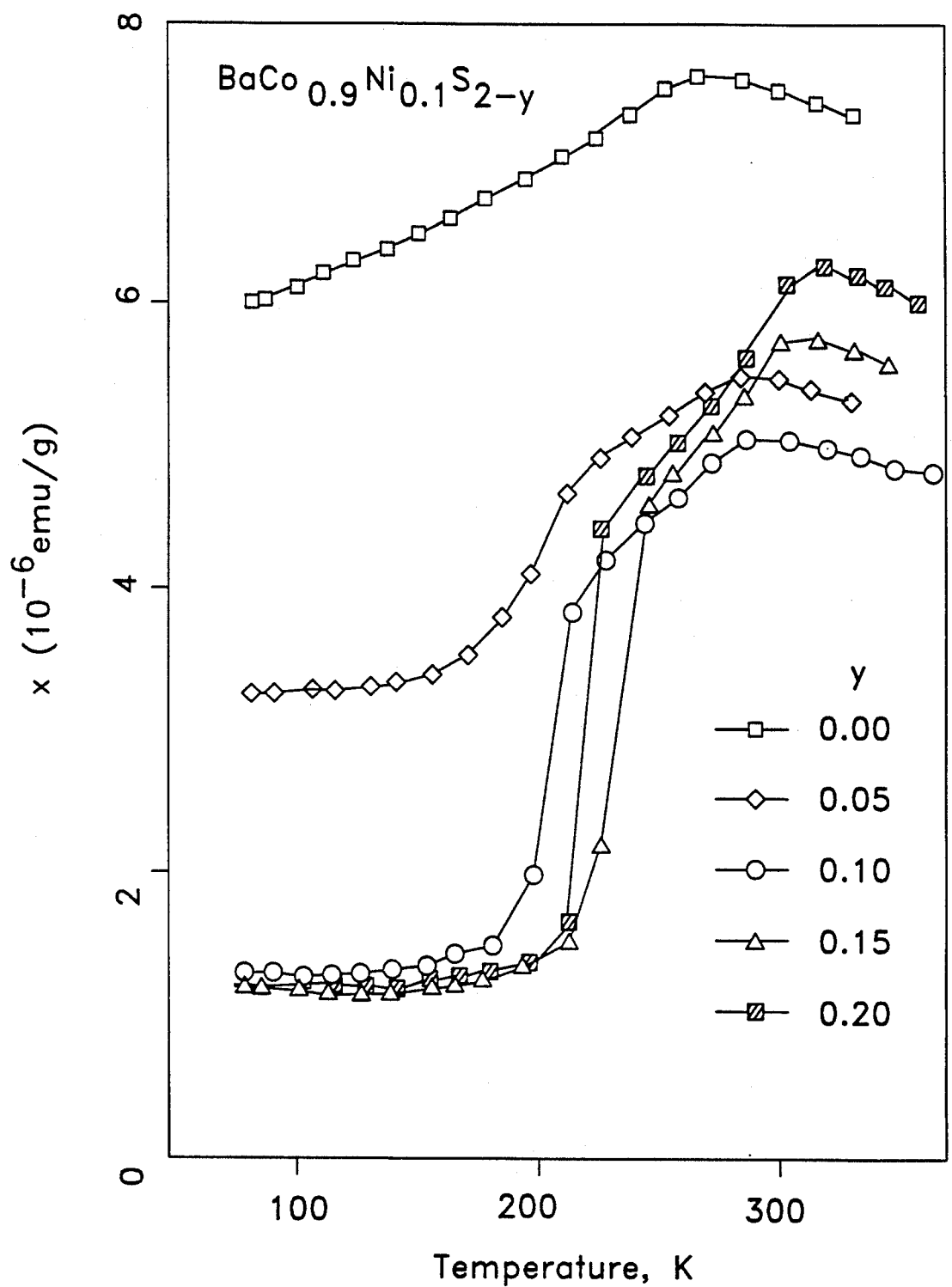
FIG. 14 shows magnetic susceptibility $\chi$ versus temperature (in degrees K.) for the samples shown in FIG. 13.

FIG. 14 shows magnetic susceptibility $\chi$ versus temperature (in degrees K.) for the samples shown in FIG. 13. Here the curves were measured while the samples were being heated. Hysteresis was observed on cooling. As can be seen, each curve has a broad maximum which shifts to higher temperatures as the sulfur vacancy concentration is increased (i.e., as y is increased).

The energy gap $E_g$ of the samples in the semiconducting state is related to the resistivity ($\rho$) as follows:

$$\rho = C \exp(E_g/k_B T), \quad (1)$$

where C is a constant, $k_B$ ($=8.625\times 10^{-5}$ eV/K) is Boltzmann's constant and T is temperature in degrees K. Taking the natural logarithm of both sides of Equation (1) yields $$\ln(\rho) = \ln C + \frac{E_g}{k_B}\left(\frac{1}{T}\right) \quad (2)$$

where C is a constant. Consequently, the energy gap of a particular sample is determined from the slope of a line formed by plotting $\ln(\rho)$ versus $1/T$.

Figure 15:
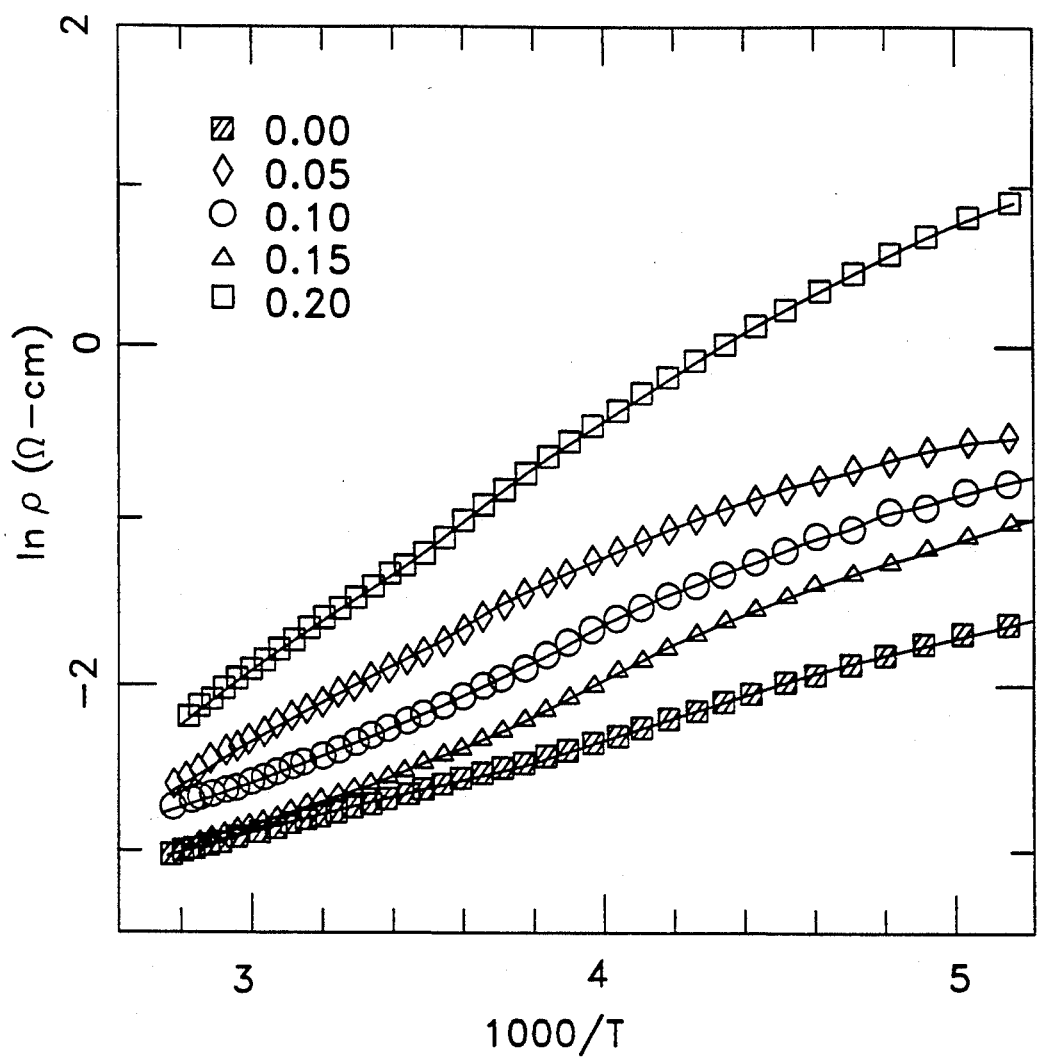
FIG. 15 shows a curve of a plot of $\ln(\rho)$ versus $1000/T$ for the samples shown in FIG. 13.

FIG. 15 shows a curve of a plot of $\ln(\rho)$ versus $1000/T$ for each of the samples of $BaCo_{0.9}Ni_{0.1}S_{2-y}$ with y=0.00 ... 0.20 from FIG. 13. As can be seen, these curves are roughly linear at high temperatures (low values of $1000/T$) and consequently are semiconducting at these low temperatures. Also, the slope of each line increases as the sulfur deficiency (the value of y) increases and consequently the energy gap $E_g$ increases as the value of y increases. In addition, as the temperature T is decreased, $\ln(\rho)$ deviates from linear behavior.

Figure 16:
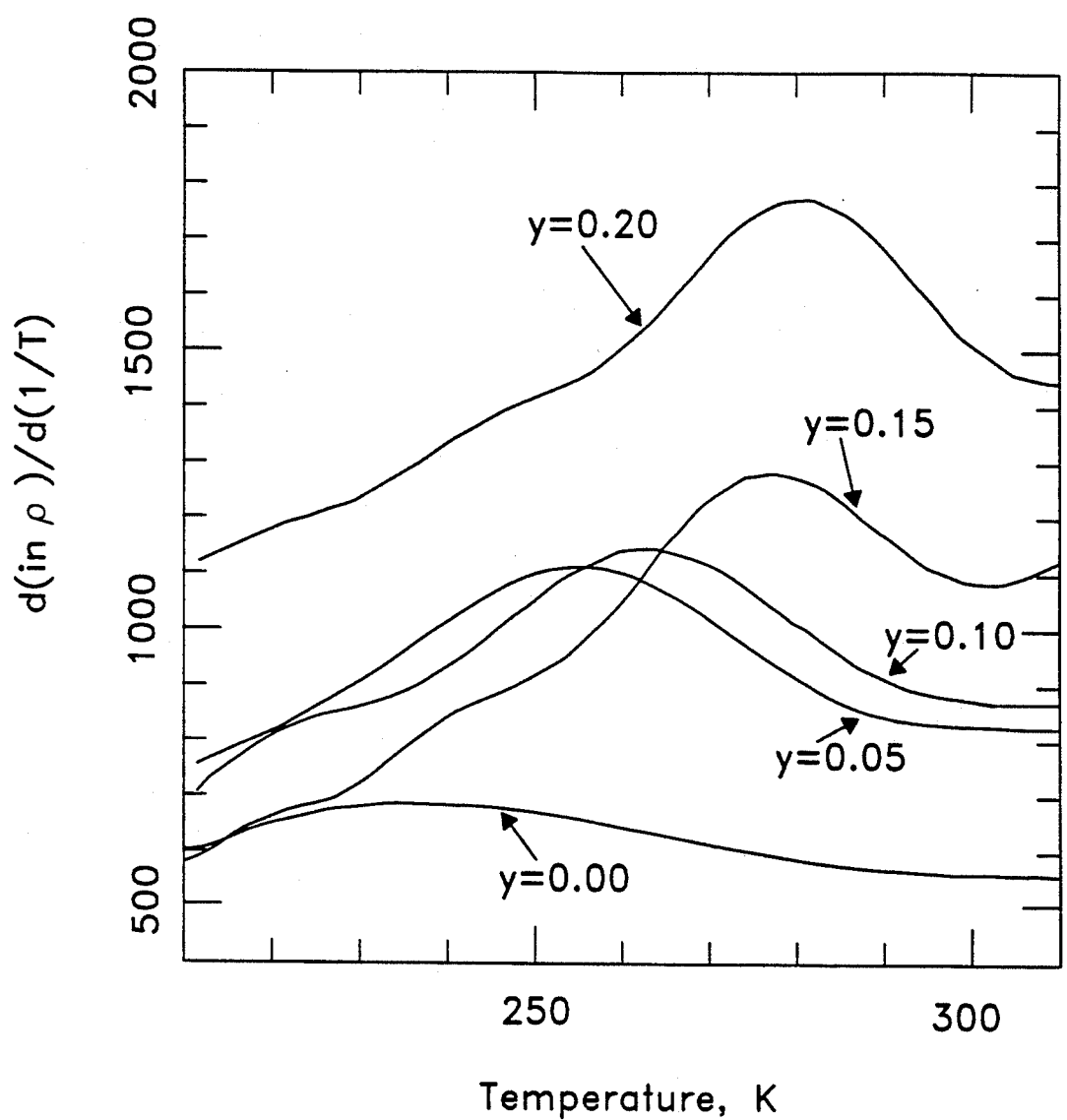
FIG. 16 shows a plot of the derivative of the curves in FIG. 15.

FIG. 16 shows a plot of the derivative of the curves in FIG. 15. In particular, FIG. 16 shows $d(\ln(\rho))/d(1/T)$ versus T in degrees K. The derivative of each of these curves was obtained by fitting data in FIG. 15 to a high order polynomial and then differentiating the resulting polynomial. The temperature at which the rate of change in $\ln(\rho)$ versus inverse temperature is zero, so $d(\ln \rho)/d(1/T)$ has a local maximum, was found to be approximately equal to the Néel temperature of the sample. (The Néel temperature $T_N$ is defined to be the maximum of a plot of $d\chi/dT$ and corresponds to the temperature at which antiferromagnetic ordering begins).

Numerous and additional modifications and variations of the present invention are possible in light of the above teachings. It is therefore to be understood that within the scope of the appended claims, the invention may be practiced otherwise than as specifically claimed.

What is claimed is:

1. A thermally bistable material $A(Co_{1-x}M_x)X_{2-y}$, where x is greater than 0 and less than 1, y is equal to or greater than 0 and less than 2, A is one element from either of group 1, group 2 or rare earth elements of the periodic table, M is a transition metal and X is one of S, Se and Te.

2. The bistable material as claimed in claim 1, wherein A is Ba.

3. The bistable material as claimed in claim 1, wherein M is Ni.

4. The bistable material as claimed in claim 1, wherein X is S.

5. A thermally bistable material $Ba(Co_{1-x}Ni_x)S_{2-y}$ having a positive temperature coefficient, where x is greater than 0 and less than 0.25 and y is greater than or equal to 0 and less than or equal to 0.2.

6. The thermally bistable material $Ba(Co_{1-x}Ni_x)S_{2-y}$ as claimed in claim 5, wherein x is less than or equal to 0.2.

7. The thermally bistable material $Ba(Co_{1-x}Ni_x)S_{2-y}$ as claimed in claim 5, wherein y is equal to or greater than 0.05.

8. The thermally bistable material $Ba(Co_{1-x}Ni_x)S_{2-y}$ as claimed in claim 5, wherein x is greater than or equal to 0.10 and less than 0.2.

* * * * *